UNITED STATES PATENT OFFICE.

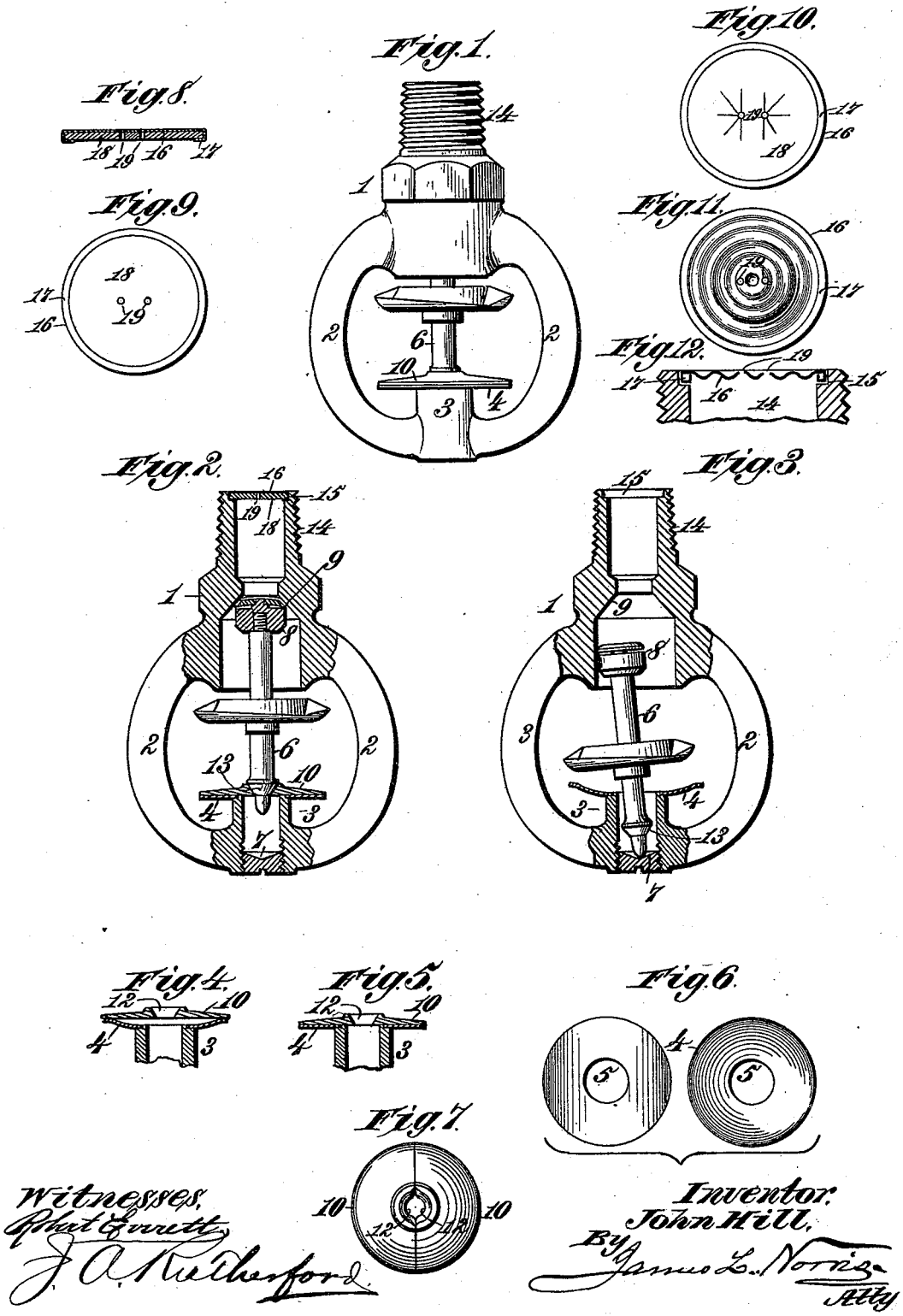

JOHN HILL, OF COLUMBUS, GEORGIA.

AUTOMATIC FIRE-EXTINGUISHER.

SPECIFICATION forming part of Letters Patent No. 427,418, dated May 6, 1890.

Application filed October 5, 1889. Serial No. 326,083. (No model.)

*To all whom it may concern:*

Be it known that I, JOHN HILL, a citizen of the United States, residing at Columbus, in the county of Muscogee and State of Georgia, have invented new and useful Improvements in Automatic Fire-Extinguishers, of which the following is a specification.

My invention relates to that class of fire-extinguishing apparatus in which water is conducted in pipes to the points where its use may be required, and there released automatically by the rupture of the support which sustains the outlet-valve and valve-stem, produced by the softening of the solder joint which maintains the support in position, caused by the dangerous rise of temperature or by the actual outbreak of a conflagration.

It is the purpose of my invention to provide means whereby the solder joint in an extinguisher of this class shall be positively and violently ruptured when the solder is sufficiently softened, thus preventing the valve from gradually settling and producing a percolation of water, which flows down upon the joint and sets the solder and by its constant dripping prevents its subsequent rupture, thereby destroying the usefulness of the extinguisher and causing a constant leakage.

It is my purpose to so construct the support for the sectional disk sustaining the valve-stem and valve that it shall maintain an elastic tension capable of suddenly and explosively disrupturing the joint whenever the solder shall have softened to a degree not sufficient to relax the strain upon the valve-stem, thereby effectually preventing the latter from settling and partly unseating the valve.

It is my purpose to provide a simple construction and combination of parts whereby the complete rupture of the solder joint shall be necessary in order to release the valve.

It is my further purpose to combine with an extinguisher of this type simple means whereby rust, sediment, and other foreign matter shall be prevented from accumulating in the orifice of the inlet-tube of the extinguisher, whereby these devices have been known to become choked and obstructed, owing to the slow accumulation of such matter during a long period of immunity from fires. My invention contemplates to this end a collapsible sediment valve or stop arranged at a suitable point in the inlet and capable of remaining intact so long as the pressure of the extinguishing-fluid is exerted upon both sides of the sediment-valve, but collapsing and tearing to fragments the instant the sustaining-valve is unseated.

My invention also has for its purpose to provide means whereby the sediment valve or stop may be inserted and the extinguisher connected with the supply-pipe to enable the inlet to fill below the valve or stop, the support for the latter being removed by the subsequent action of the extinguishing-fluid, leaving the sediment-valve in position to receive and sustain any matter depositing thereon, but collapsible upon slight preponderance of pressure upon either side.

I propose by this improvement to avoid the difficulties which have heretofore been more or less frequently experienced from the choking of the orifice of the extinguisher, due to the gradual accumulation of the rust, sediment, and other foreign material which gathers in the neck of the device and is liable in time to impact therein and defeat its operation.

The invention consists to these ends in the novel features of construction and new combinations of parts hereinafter fully described, and then pointed out in the claims following this specification.

In order to enable others skilled in the art to practice my invention, I will describe the same in detail, reference being had to the accompanying drawings, in which—

Figure 1 is an elevation of an automatic extinguisher embodying my invention. Fig. 2 is a sectional elevation of the same. Fig. 3 is a similar view showing the parts after the rupture of the solder joint and removal of sediment-stop. Fig. 4 is a detail view of the pedestal and supporting platform or disk with the sectional support placed thereon, but not soldered. Fig. 5 is a view of the same parts after the solder joint is completed. Fig. 6 is a detail plan view of the platform or supporting-disk, showing two forms thereof. Fig. 7 is a detail plan view of the sectional support. Fig. 8 is an edge view of the sediment stop or valve. Fig. 9 is a plan view of one form of the same, the valve being flat with a flanged edge. Fig. 10 is a plan view showing a slight modification; Figs. 11 and 12, a plan and section showing a further modification.

In the said drawings the reference-numeral 1 denotes the extinguisher-head in its usual form, the numeral 2 designating the arms supporting the solder-joint, the valve-stem, and distributer. These arms unite with a pedestal 3, upon which is mounted a platform or disk 4, having a central opening 5 large enough to freely admit the end of the valve-stem 6 and allow it to drop within the pedestal and rest upon the step 7. The valve-stem sustains a valve 8, which, when the solder-joint is formed, is seated upon a valve-seat 9 in the distributer-head.

The platform or disk 4 consists, according to my invention, of a thin plate of elastic metal, which is usually in the form of a disk, though other forms may be used. This disk is normally concave or dish-shaped, although I may employ the equivalent form shown in Fig. 6, in which it is bent or concaved in one direction only, and in either of these forms it is rigidly attached to the pedestal by riveting or in any other suitable manner. Upon the platform or support 4 thus formed is placed the sectional support, consisting of a disk divided into two or more parts 10, having flat lower surfaces resting upon the platform, while their upper faces are either convex or of any other suitable shape. The sectional parts 10 are provided with partial openings 12, which form, when the sections are united, an aperture large enough to admit the point of the valve-stem 6, which is usually provided with an expanding shoulder 13, seating in the countersunk aperture of the sectional support. The solder joint is formed by forcing the sectional support 10 against the platform 4 until the latter is flattened and every part of its surface is brought into contact with the flat faces of the sectional parts 10. The soft solder which has been previously applied to these surfaces is allowed to set while they are in contact throughout. When the joint is completed, the valve-stem will be supported, with the valve 8 properly seated; but, owing to the natural elasticity of the metal forming the platform, an elastic tension is constantly exerted upon the joint, tending to rupture it, but insufficient to overcome the adhesion of the solder. When the surrounding temperature rises sufficently to soften the solder, the tension of the platform or disk 4 at the predetermined point suddenly and explosively bursts or ruptures the joint, expelling the sectional parts 10 from the platform and releasing the valve 8.

I prefer to form the platform or elastic disk 4 curved, as shown, with the extreme outer edge of each apex of curve somewhat flattened, said flattened surfaces underlying the line of split of the sectional support or disk resting thereon in such manner that either of the parts 10 when soldered in position will retain the elastic platform in its flattened position, thereby requiring the release of both parts before the valve-stem is set free. The same result, however, is effected when the concave or dish-shaped platform is employed.

It is evident that the platform may be square, round, elliptical, or polygonal in form without departing from my invention.

In order to prevent the accumulation of sediment, rust, and similar foreign matter in the inlet-pipe or neck 14 of the extinguisher, I form at a suitable point therein—as, for example, at the open end of said pipe—a seat or recess 15, within which is fitted a flanged diaphragm or disk 16, formed of very thin flexible metal, such as tin-foil. This disk when fitted is provided with a flange 17 upon its edge, in which is inserted a disk of card-board or some other suitable material 18, which is more rigid than tin-foil. When inserted, this card-board is dry, and, together with the foil diaphragm, it is sprung into the recess or seat 15, where it is retained by its elasticity. In order to equalize the pressure of the extinguishing-fluid upon both sides of this diaphragm, one or more small apertures 19 are punched through both the foil and card-board, whereby as the extinguisher is attached to the supply-pipe and the fluid allowed to fill the latter it will slowly percolate through the two disks and fill the neck 14 of the extinguisher, thus giving an equal pressure on both sides the foil. The card-board disk during this operation serves to support the foil and prevent its rupture; but as it becomes saturated with the extinguishing-fluid it is speedily dissolved and destroyed, leaving only the thin tin-foil diaphragm which receives the sediment from the pipe, but which is so thin and weak as to rupture upon the least preponderance of pressure upon one side or the other. The instant the valve 8 unseats the foil is ruptured and wholly destroyed, its fragments being carried through the discharge-opening with the fluid. The perforations 19 in the foil are so small as to practically exclude all perceptible sediment, and they are soon covered by the deposit if any quantity thereof accumulates. These openings may, however, be wholly omitted if the neck or inlet 14 is filled with the fluid before the extinguisher is attached to the pipe, and in this case also the card-board diaphragm is unnecessary.

The foil diaphragm may be formed of lead or other metals or of any alloy of metal adapted to the purpose, or any other material which is not soluble in or attacked by the extinguishing-fluid, and it may be made so flexible that it will pass out bodily with said fluid when the extinguisher-valve is opened. This supporting-disk 18 may likewise be made of any material other than card-board having sufficient strength when dry to support the foil and capable of being attacked and destroyed or disintegrated by the extinguishing fluid.

The foil disk may be placed in the inlet at any suitable point, and either cemented or soldered in place and with or without the disk 18. It may also be slitted, as shown in Fig. 10, to enable the fluid when released to more easily rupture and destroy it. I may also corrugate the foil, as shown in Fig. 11, and I prefer this form when it is used without the supporting-disk 18, although I may use the latter with this construction, if desirable. This device is an effectual stop and protection against sediment of all kinds which might otherwise accumulate in and obstruct the orifice in the inlet or neck 14 above the valve 8.

What I claim is—

1. An automatic fire-extinguisher having an outlet or discharge opening closed by a valve and provided with an elastic platform or disk normally bent or curved to present a surface which is concave in one or more directions, in combination with a sectional support holding the valve-stem and united by a fusible solder with the surface of said platform when the latter is flattened, substantially as described.

2. In an automatic fire-extinguisher, the combination, with an elastic platform or disk mounted on the pedestal and normally bent or curved to present a surface which is concave in one or more directions, of a sectional support having a flat surface, which is united by soft solder to every part of the said concave or curved surface, substantially as described.

3. In an automatic fire-extinguisher, the combination, with an elastic platform or disk mounted on the pedestal and bent or curved to present a surface which is concave in one or more directions, of a sectional support having flat lower faces secured to said curved or concave surface by forcing the parts into contact, thereby putting the platform under a permanent tension, and a valve-stem resting with its point in a central aperture in the sectional support, substantially as described.

4. In a fire-extinguisher having an outlet or discharge opening closed by a valve, the combination, with the curved or concaved platform or disk 4, formed of elastic metal and attached to the pedestal of the extinguisher, of the sectional support 10, supporting the valve-stem and having a flat lower surface, which is brought into contact with the flattened platform and united therewith by a fusible connection, substantially as described.

5. In an automatic fire-extinguisher, a sediment diaphragm or stop arranged in the inlet or neck above the valve and valve-seat and adapted to be collapsed or ruptured by the pressure of the fluid upon the release of the extinguisher-valve, substantially as described.

6. In an automatic fire-extinguisher, the combination, with the inlet or neck, of a thin collapsible diaphragm arranged above the valve and valve-seat and formed of a material not attacked by the extinguishing-fluid, substantially as described.

7. In an automatic fire-extinguisher, the combination, with the inlet or neck, of a thin flexible diaphragm or stop arranged in said inlet above the valve and valve-seat and having one or more perforations, substantially as described.

8. In an automatic fire-extinguisher, the combination, with the inlet or neck, of a sediment-diaphragm arranged in said inlet above the valve and valve-seat and slitted, substantially as described.

9. In an automatic fire-extinguisher, the combination, with the inlet or neck, of a sediment-diaphragm formed of thin collapsible material and of material not attacked by the extinguishing-fluid, and a disk of more rigid material supporting the diaphragm and formed of material which is soluble in or attacked by said fluid, both diaphragm and disk being provided with small perforations, substantially as described.

10. In an automatic fire-extinguisher, the combination, with the inlet or neck, of a collapsible diaphragm having a flange inclosing the edge of a disk of more rigid material, both arranged in a suitable seat in the inlet and provided with small perforations, substantially as described.

11. In a fire-extinguisher, the combination, with the inlet or neck, of a collapsible diaphragm arranged to receive the sediment, and a support for said diaphragm adapted to resist the pressure of the fluid and to be driven out with the diaphragm on the release of the extinguisher-valve, substantially as described.

In testimony whereof I have affixed my signature in presence of two witnesses.

JOHN HILL.

Witnesses:
  L. F. WOODRUFF,
  HENRY BRUCE.